US009170819B2

(12) United States Patent
Chaussade et al.

(10) Patent No.: US 9,170,819 B2
(45) Date of Patent: Oct. 27, 2015

(54) FORWARDING CONDITION INFORMATION FROM FIRST PROCESSING CIRCUITRY TO SECOND PROCESSING CIRCUITRY

(71) Applicant: ARM LIMITED, Cambridge (GB)

(72) Inventors: Nicolas Chaussade, Sophia Antipolis Cedex (FR); Luca Scalabrino, Sophia Antipolis Cedex (FR); Frederic Jean Denis Arsanto, Sophia Antipolis Cedex (FR); Cedric Denis Robert Airaud, Sophia Antipolis Cedex (FR)

(73) Assignee: ARM Limited, Cambridge (GB)

( * ) Notice: Subject to any disclaimer, the term of this patent is extended or adjusted under 35 U.S.C. 154(b) by 439 days.

(21) Appl. No.: 13/737,137

(22) Filed: Jan. 9, 2013

(65) Prior Publication Data

US 2014/0195780 A1 Jul. 10, 2014

(51) Int. Cl.
*G06F 9/30* (2006.01)
*G06F 9/38* (2006.01)

(52) U.S. Cl.
CPC ............................ *G06F 9/3867* (2013.01)

(58) Field of Classification Search
None
See application file for complete search history.

(56) References Cited

U.S. PATENT DOCUMENTS

2008/0294879 A1* 11/2008 Wielage .................. 712/225

* cited by examiner

*Primary Examiner* — Scott Sun
(74) *Attorney, Agent, or Firm* — Nixon & Vanderhye P.C.

(57) ABSTRACT

A data processing apparatus comprises first and second processing circuitry. A conditional instruction executed by the second processing circuitry may have an outcome which is dependent on one of a plurality of sets of condition information maintained by the first processing circuitry. A first forwarding path can forward the sets of condition information from the first processing circuitry to a predetermined pipeline stage of a processing pipeline of the second processing circuitry. A request path can transmit a request signal from the second processing circuitry to the first processing circuitry, the request signal indicating a requested set of condition information which was not yet valid when a conditional instruction was at the predetermined pipeline stage. A second forwarding path may forward the requested set of condition information to a subsequent pipeline stage when the information becomes valid.

20 Claims, 4 Drawing Sheets

CPSR

|   | N | Z | C | V |
|---|---|---|---|---|
| 0 |   |   |   |   |
| 1 |   |   |   |   |
| 2 |   |   |   |   |
| 3 |   |   |   |   |
| 4 |   |   |   |   |
| 5 |   |   |   |   |
| 6 |   |   |   |   |
| 7 |   |   |   |   |
| 8 |   |   |   |   |
| 9 |   |   |   |   |
| 10|   |   |   |   |
| 11|   |   |   |   |

| cycle | core 4 | data engine 6 |
|---|---|---|
| 0 | inst 0 produces CPSR 0, CPSR 0 not valid yet (valid [0]=0) | |
| ⋮ | ⋮ | ⋮ |
| 5 | CPSR 0 valid (valid [0]=1) | |
| 6 | | inst 1 conditional (requires CPSR0) is in rename stage, gets CPSR0 from 1st forwarding path (valid [0]=1) |
| ⋮ | ⋮ | ⋮ |
| 10 | inst 2 produces CPSR 2, not valid yet (valid [2]=0) | |
| 11 | | inst 3 conditional (requires CPSR2) in rename stage, cannot use 1st forwarding path because valid [2]=0 |
| 12 | inst 4 produces CPSR 4, not valid yet (valid [4]=0) | inst 3 sent to dispatch stage, feedback [2]=1 |
| 13 | | inst 5 conditional (requires CPSR4) in rename stage, cannot use 1st forwarding path because valid [4]=0 |
| 14 | | inst 5 sent to dispatch stage, feedback [4]=1 |
| ⋮ | ⋮ | ⋮ |
| 20 | CPSR 2, CPSR 4 both valid (valid [2]=1, valid [4]=1) send CPSR 2, add 0x2 on 2nd forwarding path | |
| 21 | send CPSR 4, add 0x4 on 2nd forwarding path | receive CPSR 2, can now process inst 3 feedback [2]=0 |
| 22 | | receive CPSR 4, can now process inst 5 feedback [4]=0 |

FIG. 6

FORWARDING CONDITION INFORMATION FROM FIRST PROCESSING CIRCUITRY TO SECOND PROCESSING CIRCUITRY

BACKGROUND TO THE INVENTION

1. Field of the Invention

The present invention relates to the field of data processing. In particular, the invention relates to forwarding condition information from first processing circuitry to second processing circuitry.

2. Background to the Invention

A data processing apparatus may comprise first processing circuitry and second processing circuitry. For example, the second processing circuitry may provide auxiliary processing functions which are not available in the first processing circuitry. Sometimes, the outcome of an instruction being executed by the second processing circuitry may be dependent on the outcome of an instruction executed by the first processing circuitry. For example, the second processing circuitry may execute a conditional instruction whose outcome is dependent on condition information maintained by the first processing circuitry, the condition information indicating various properties of the outcome of a program instruction executed by the first processing circuitry. To allow the conditional instruction to be executed correctly, condition information may be sent from the first processing circuitry to the second processing circuitry. The circuitry for forwarding the condition information can be complex, and so the present invention seeks to reduce the complexity of this circuitry and improve the efficiency of forwarding of condition information from first processing circuitry to second processing circuitry.

SUMMARY OF THE INVENTION

Viewed from one aspect, the present invention provides a data processing apparatus comprising:

first processing circuitry configured to execute program instructions and to maintain a plurality of sets of condition information for indicating characteristics of the outcomes of the program instructions;

second processing circuitry comprising a processing pipeline having a plurality of pipeline stages, wherein the second processing circuitry is configured to execute at least one conditional instruction having an outcome dependent on one of the plurality of sets of condition information maintained by the first processing circuitry;

a first forwarding path configured to forward sets of condition information from the first processing circuitry to a predetermined pipeline stage of the processing pipeline of the second processing circuitry;

a request path configured to transmit a request signal from the second processing circuitry to the first processing circuitry, the request signal for indicating a requested set of condition information which was not yet valid when a conditional instruction dependent on the requested set of condition information was at the predetermined pipeline stage; and a second forwarding path, wherein in response to the requested set of condition information becoming valid, the first processing circuitry is configured to forward the requested set of condition information via the second forwarding path to a subsequent pipeline stage of the processing pipeline of the second processing circuitry.

The first processing circuitry may maintain multiple sets of condition information corresponding to the outcomes of program instructions. The second processing circuitry may have a processing pipeline with a plurality of pipeline stages for processing instructions. In previous implementations, all the sets of condition information maintained by the first processing circuitry would be output to each pipeline stage of the second processing circuitry, so that whenever a set of condition information becomes valid, a corresponding conditional instruction at any stage of the pipeline in the second processing circuitry can access the condition information and be processed. However, this requires many signal paths between the first processing circuitry and each pipeline stage of the second processing circuitry, and monitoring logic in the pipeline of the second processing circuitry to monitor the received condition information. This can incur a large area and power consumption overhead, especially if the number of sets of condition information maintained by the first processing circuitry, or the number of pipeline stages in the second processing circuitry, becomes large.

The present technique seeks to reduce the overhead associated with forwarding the condition information. First and second forwarding paths are provided for forwarding sets of condition information from the first processing circuitry to the second processing circuitry, and a request path is provided for transmitting a request signal from the second processing circuitry to the first processing circuitry. The first forwarding path forwards sets of condition information from the first processing circuitry to a predetermined pipeline stage of the processing pipeline in the second processing circuitry. If a required set of condition information is valid when a corresponding conditional instruction is in the predetermined pipeline stage of the second processing circuitry, then the valid information can be used for processing the instruction and no further forwarding is required. However, if the condition information is not yet valid when the conditional instruction is at the predetermined pipeline stage, then the second processing circuitry may transmit a request signal to the first processing circuitry indicating the required set of conditional information as a requested set of condition information. When a requested set of condition information indicated in the request signal becomes valid, then the first processing circuitry uses the second forwarding path to forward the requested set of condition information to a subsequent pipeline stage of the processing pipeline in the second processing circuitry.

Since the second processing circuitry can request which sets of condition information are required, and the first processing circuitry transmits just the requested sets of condition information via the second forwarding path, it is not necessary to provide resources for transmitting all of the sets of condition information to many stages of the pipeline, and resources are saved by transmitting the information only when requested. Nevertheless, the first forwarding path which can forward all the sets of condition information is also useful because if condition information is valid in time for a conditional instruction at the predetermined pipeline stage, then less data needs to be sent on the second forwarding path, freeing bandwidth on the second forwarding path for other sets of condition information and enabling a smaller second forwarding path to be used. Therefore, the combination of the first and second forwarding paths and the request path enables fewer signal paths and less monitoring logic to be provided, making the implementation of the condition information forwarding more efficient in terms of circuit area, complexity and power consumption.

There may be various mechanisms for detecting when a set of condition information becomes valid. A set of condition information becomes valid when its values are known to be correct. For example, each set of condition information may have an associated valid signal whose state indicates whether the information is valid. The valid signal may be set in response to instructions executed by either the first processing circuitry or the second processing circuitry, once it is known that there are no further instructions which can influence the condition information. While in general each set of condition information will indicate the outcome of a particular instruction, it is possible for other instructions also to influence the condition information, for example some condition information has a value inherited from the result of a preceding instruction.

While waiting for the required condition information to become valid, the conditional instruction which is dependent on the condition information may be held within the processing pipeline of the second processing circuitry. When the requested set of condition information is received via the second forwarding path, the second processing circuitry may process the conditional instruction using the received set of condition information. The second processing circuitry may have monitoring circuitry for monitoring the second forwarding path to check for requested sets of condition information.

The first processing circuitry may maintain C sets of condition information, where C is an integer. The second forwarding path does not need to be capable of forwarding all sets of condition information in the same processing cycle. Instead, the second forwarding path may have a bandwidth capable of forwarding only N sets of condition information in one cycle, where N is an integer less than C. Hence, the second forwarding path may be a "scaled down" forwarding path compared to the first forwarding path. It would typically be unusual for many sets of requested condition information to become valid in the same processing cycle, because often most sets of condition information would be valid in time for the predetermined pipeline stage of the second processing circuitry, so there may not be many requested sets of condition information, let alone requested sets all becoming valid in the same cycle. Therefore, it may be sufficient for only a few sets of condition information to be transmitted in one cycle via the second forwarding path.

In one example, N may be equal to 1, so that the second forwarding path can only transmit one set of valid condition information per processing cycle. This enables the second forwarding path to be implemented with the smallest circuit area and lowest power consumption, and often this will be enough for forwarding the requested sets of condition information.

If more than N requested sets of condition information become valid in the same processing cycle, then these can be transmitted serially via the second forwarding path in multiple processing cycles. While this may sometimes cause a slight delay to the processing of a conditional instruction by the second processing circuitry, this penalty would generally be outweighed by the reduced circuit area and power consumption achieved by reducing the width of the second forwarding path.

The request signal may be implemented in various ways. It would be possible to transmit an identifier identifying the requested set of condition information. In another example, the request signal may indicate, for each set of condition information, whether or not the set of condition information is a requested set of condition information (i.e. a set of condition information that was required by a conditional instruction when the conditional instruction was at the predetermined pipeline stage of the second processing circuitry, and for which the condition information was not valid when the conditional instruction was at the predetermined pipeline stage). For example, the request signal may comprise several signal lines, one for each set of condition information, with one state (e.g. logic high) of the signal line indicating that the set of condition information is requested, and the other state (e.g. logic low) indicating that it is not requested.

The second processing circuitry may be responsible for controlling setting of the request signal. When a conditional instruction requires a selected set of condition information which is not valid when the conditional instruction is at the predetermined pipeline stage, then the second processing circuitry may control the request signal to indicate that the selected set of condition information is a requested set of condition information. This indicates to the first processing circuitry that when the selected set of condition information becomes valid it should be forwarded on the second forwarding path.

On the other hand, in response to a conditional instruction requiring a selected set of condition information which is valid when the conditional instruction is at the predetermined pipeline stage, the second processing circuitry may control the request signal to indicate that the selected set of condition information is not requested set of condition information. This indicates that the first processing circuitry does not need to transmit the set of condition information on the second forwarding path, freeing bandwidth for other sets of condition information.

When a requested set of condition information is received by the second forwarding path, then the second processing circuitry may also control the request signal to indicate that the received set of condition information is not a requested set of condition information. This is useful for several reasons. Firstly, this prevents the set of condition information being transmitted again via the second forwarding path, which would waste bandwidth. Also, as will be explained below, this helps with reallocation of registers for storing the set of condition information, improving processing performance.

As well as the set of condition information, the second forwarding path may also transmit an identifier identifying the requested set of condition information. This allows the second processing circuitry to identify which set of condition information is being transmitted and to allocate the received data to the appropriate condition instruction in the pipeline. Also, this enables the second processing circuitry to determine which part of the request signal to modify to indicate that the received set of condition information is no longer requested.

The condition information may be maintained in different ways by the first processing circuitry. A simple technique is to provide a plurality of condition information registers for storing the plurality of sets of condition information. The identifier of the set of condition information mentioned above may be a register identifier or address identifying the corresponding condition information register.

The first processing circuitry or the second processing circuitry may comprise register allocation circuitry (also known as register renaming circuitry) for controlling allocation of the condition information registers to respective program instructions to the executed by the first or second processing circuitry. Generally, the condition information register allocated to a particular program instruction is used to store the condition information relating to the outcome of that program instruction, although other instructions may also influence the condition information (e.g. if a condition flag is inherited from a preceding instruction in the program flow order).

When a set of condition information is no longer required by any instructions in the first processing circuitry or the second processing circuitry, then the register allocation circuitry can reallocate the register to a different instruction. As there are a finite number of condition information registers, when all the condition information registers are being used then further instructions which require a register to be allocated cannot be processed. Therefore, constraints on the reallocation of the condition information registers can limit processing performance.

One advantage of the first forwarding path is that, if a set of condition information is valid in time for a conditional instruction in the predetermined pipeline stage, then the valid information can be retained in the pipeline of the second processing circuitry so that further access to the corresponding condition information register in the first processing circuitry is not required in order to execute the conditional instruction. Provided there are no other instructions which depend on the set of condition information, the condition information register can then be reallocated for a different instruction. Hence, the first forwarding path, which can allow condition information to be accessed at a relatively early stage of the pipeline in the second processing circuitry, can reduce the number of cycles for which the condition information has to remain valid in the condition information register. This allows reallocation to be performed more quickly and hence processing performance can be improved.

The register allocation circuitry may prevent reallocation of a condition information register for which the corresponding set of condition information is indicated as a requested set of condition information by the request signal. While a conditional instruction in the second processing circuitry is pending which requires condition information from one of the condition information registers, then that register cannot be reallocated because the condition information is still required. As mentioned above, for performance reasons it is desirable to allow the register to be reallocated as soon as possible. Therefore, when a set of condition information is received via the second forwarding path, the second processing circuitry may set the request signal to indicate that the received set of condition information is no longer requested, so that this constraint on reallocation of the corresponding register is removed.

Each set of condition information may comprise one or more condition flags, with each conditional flag indicating a characteristic of an outcome of a program instruction. Typically there would be multiple conditional flags indicating different characteristics, for example, one flag indicating whether an instruction produced a zero result, and another flag indicating whether the result was negative.

The predetermined pipeline stage which receives the condition values from the first processing circuitry may be any stage of the pipeline. However, it may be efficient for the predetermined pipeline stage to be a relatively early stage in the pipeline, so that if the condition information is valid in time for this stage, then the corresponding register in the first processing circuitry can be reallocated as soon as possible. For example, the predetermined pipeline stage may be the register allocation stage of the second processing circuitry. Since the register allocation stage (also known as renaming stage) typically examines which operands (registers) are required by instructions passing through the pipeline, then it can be efficient to allow this stage to also check whether the required condition information register stores valid condition information. However, this could also be done by other stages in the pipeline. The subsequent stage which receives the condition information via the second forwarding path may be any stage downstream from the predetermined pipeline stage. In some cases there may be only one subsequent stage which can received the requested set of condition information, while in other cases multiple stages can receive the information from the second path.

The first and second processing circuitry may comprise in-order processors which execute the instruction in the same order as the program flow order in which they appear in the program being executed. Where there are parallel execution pipelines, then for performance reasons it can be useful to maintain multiple sets of condition information corresponding to different instructions, so that one instruction does not need to wait for the outcome of an earlier instruction before being processed in parallel.

However, the present technique is particularly useful when at least the first processing circuitry is able to perform out-of-order execution of program instructions. In out-of-order execution, a later instruction in the program flow order may bypass an earlier instruction and be executed before the earlier instruction. This can be useful, for example if a data dependency hazard causes a delay in processing the earlier instruction and the later instruction does not encounter this data dependency. Since the instructions can be executed out of order, it is useful to store multiple sets of condition information corresponding to the result of each instruction so that these can be held until earlier instructions in the program flow order have been executed and the condition information is known to be valid. The second processing circuitry may also comprise out-of-order processing circuitry.

The second processing circuitry may be of various types. In some examples the second processing circuitry may be the same kind of processing circuitry as the first processing circuitry. However, in other examples, the second processing circuitry may provide processing capability which the first processing circuitry cannot provide. For example the first processing circuitry may be a general processor core while the second processing may be a data engine for processing certain types of instructions. For example the data engine may execute floating-point instructions (e.g. the VFP architecture provided by ARM® Limited of Cambridge, UK), or single-instruction-multiple-data (SIMD) program instructions for carrying out SIMD operations (e.g. the NEON™ architecture provided by ARM® Limited of Cambridge, UK). Other types of instructions could also be executed by the data engine.

Viewed from another aspect, the present invention provides a data processing apparatus comprising:

first processing means for executing program instructions and for maintaining a plurality of sets of condition information for indicating characteristics of the outcomes of the program instructions;

second processing means, comprising a processing pipeline having a plurality of pipeline stage means for processing program instructions, for executing at least one conditional instruction having an outcome dependent on one of the plurality of sets of condition information maintained by the first processing means;

first forwarding means for forwarding sets of condition information from the first processing means to a predetermined pipeline stage means of the processing pipeline of the second processing means;

requesting means for transmitting a request signal from the second processing means to the first processing means, the request signal for indicating a requested set of condition information which was not yet valid when a conditional instruction dependent on the requested set of condition information was at the predetermined pipeline stage means; and second forwarding means for forwarding the requested set of condition information, wherein in response to the requested set of condition information becoming valid, the first processing means is configured to forward the requested set of condition information via the second forwarding means to a subsequent pipeline stage means of the processing pipeline of the second processing means.

Viewed from a further aspect, the present invention provides a data processing method comprising:

executing program instructions using first processing circuitry, the first processing circuitry maintaining a plurality of sets of condition information for indicating characteristics of the outcomes of the program instructions;

executing at least one conditional instruction using second processing circuitry comprising a processing pipeline having a plurality of pipeline stages, the at least one conditional instruction having an outcome dependent on one of the plurality of sets of condition information maintained by the first processing circuitry;

forwarding sets of condition information from the first processing circuitry via a first forwarding path to a predetermined pipeline stage of the processing pipeline of the second processing circuitry;

transmitting a request signal from the second processing circuitry to the first processing circuitry, the request signal indicating a requested set of condition information which was not yet valid when a conditional instruction dependent on the requested set of condition information was at the predetermined pipeline stage; and in response to the requested set of condition information becoming valid, forwarding the requested set of condition information from the first processing circuitry via a second forwarding path to a subsequent pipeline stage of the processing pipeline of the second processing circuitry.

Further particular and preferred aspects of the present invention are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

FIG. 6 shows an example of a sequence of instructions processed by the data processing apparatus.

DESCRIPTION OF EXAMPLE EMBODIMENTS

Figure 1:
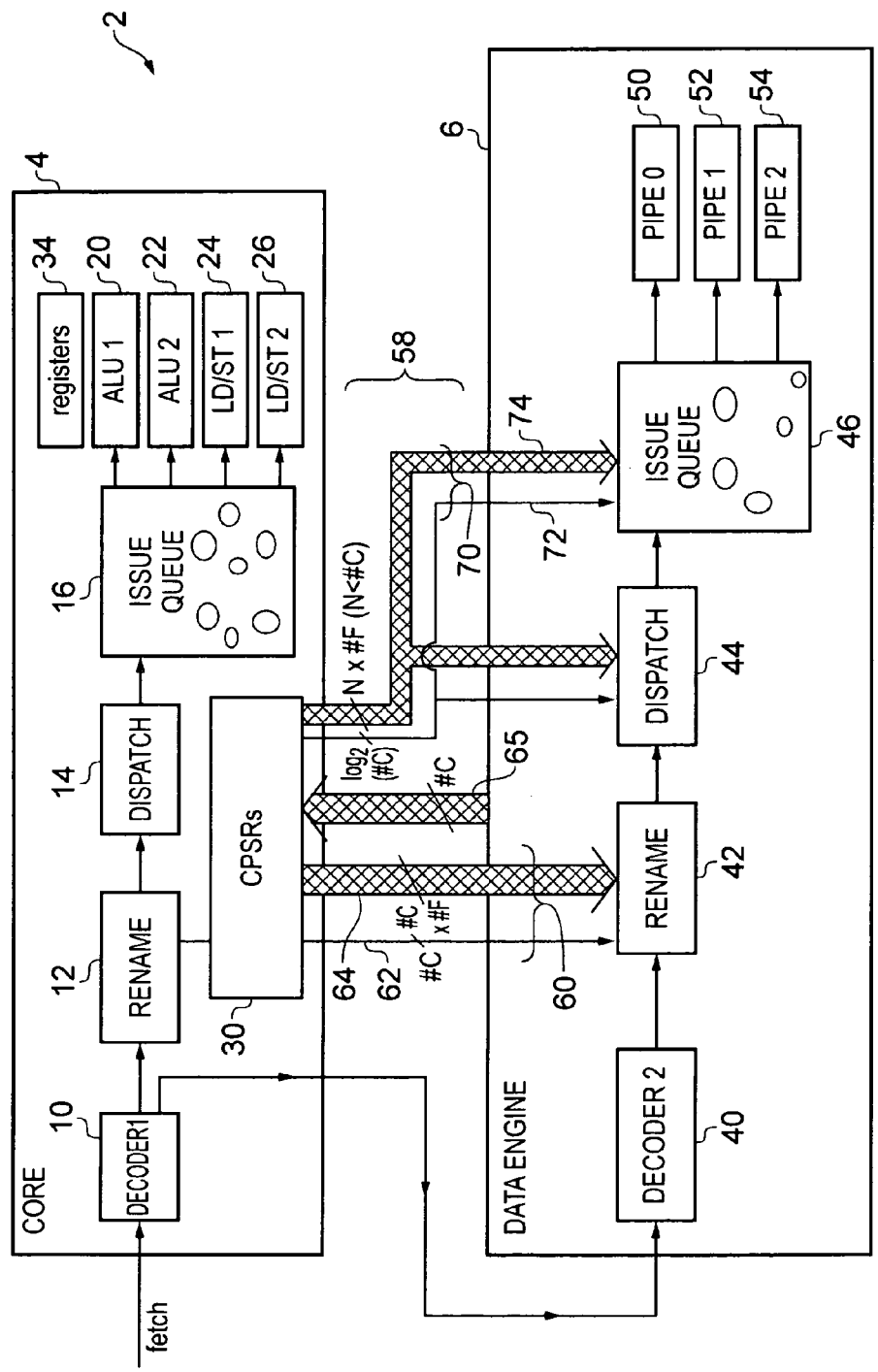
FIG. 1 schematically illustrates a data processing apparatus comprising first processing circuitry and second processing circuitry.

FIG. 1 illustrates a data processing apparatus 2 comprising first processing circuitry 4 and second processing circuitry 6. In this example the first processing circuitry 4 comprises a general purpose processor core and the second processing circuitry 6 comprises a data engine such as a floating-point unit for performing floating-point operations or a SIMD processing unit for performing advanced single-instruction-multiple-data (SIMD) operations.

The first processing circuitry 4 comprises a processing pipeline having a decode stage 10, a rename stage 12, a dispatch stage 14, an issue queue 16 and several execution stages 20, 22, 24, 26. The first processing circuitry 4 also comprises several condition information registers 30, also known as current program status registers (CPSRs). Instructions fetched from an instruction cache or memory are input to the decode stage 10 of the first processing circuitry 4. If an instruction is of the type to be processed by the second processing circuitry 6 then it is forwarded to the second processing circuitry 6, while otherwise it is sent to the rename stage 12. The rename stage 12 performs register renaming to map architectural register specifiers identified by the decoded instructions to physical register specifiers identifying physical registers 34 of the first processing circuitry 4. The rename stage 12 can detect data dependency hazards between different program instructions, and map conflicting architectural register specifiers to different physical register specifiers to eliminate some constraints on the scheduling of execution of the program instructions. The register renaming stage 12 also identifies whether the instruction will produce condition information to be stored to a condition information register 30, and if so, allocates one of the condition information registers 30 for storing a set of condition information corresponding to the instruction. The condition information indicates characteristics of the outcome of the instruction.

Figures 2, 3:
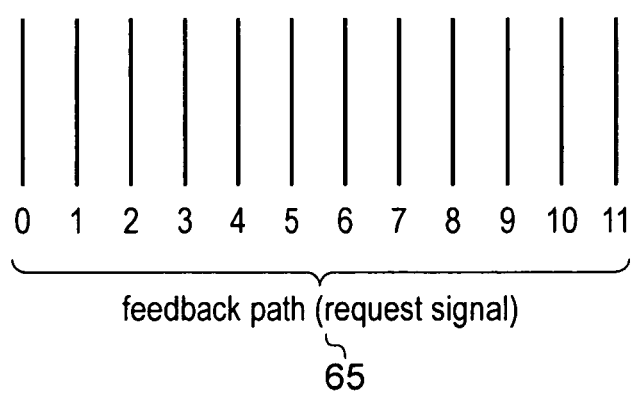
FIG. 2 illustrates condition information registers of the first processing circuitry.
FIG. 3 illustrates an example of a request signal for requesting that requested sets of condition information are transmitted via a second forwarding path.

FIG. 2 shows an example of the data stored in the condition information registers 30 of the first processing circuitry 4. A given number of condition information registers are provided (in this example, 12 registers) and each register stores several condition flags, each flag indicating a characteristic of the outcome of a corresponding program instruction. In this example, the condition flags include a negative flag N for indicating whether a processing result has a negative value, a zero flag Z for indicating whether the processing result is equal to zero, a carry flag C for indicating whether the result of an unsigned processing operation has overflowed the result register, and a signed overflow flag V for indicating whether a signed operation has caused an overflow from the most positive value (0b01111 . . . ) representable by the signed operand to the most negative value (0b10000 . . . ) representable using the signed operand. However, it will be appreciated that other types of flags, or different numbers of flags, may be stored in the condition information registers 30. Information other than condition flags could also be stored in the registers 30. A conditional instruction executed by either the first processing circuitry 4 or the second processing circuitry 6 may cause a corresponding conditional operation to be performed only if the flag values from a required condition information register 30 satisfy a condition specified by the instruction. The rename stage 12 or 42 determines for the conditional instruction which of the condition information registers 30 stores the condition information required for that conditional instruction.

Referring again to FIG. 1, instructions which have undergone renaming in the rename stage 12 are sent to the dispatch stage 14 where they are dispatched to an issue queue 16. The instructions reside in the issue queue 16 until any required operands are available, and the instruction is then issued to an appropriate one of the execute stages 20, 22, 24, 26 for execution. In this example, the execute stages include two arithmetic logic unit (ALU) pipelines 20, 22 and two load/store pipelines 24, 26, although other types of execution pipelines may be provided. The first processing circuitry 4 is an out-of-order processor in which the data instructions may be issued for execution in an execution order which is different to the program flow order in which they appear within the program being executed. For example, if an earlier instruction in the program flow order is awaiting an operand, then a later instruction whose operands are available may be issued for execution ahead of the earlier instruction and bypass the earlier instruction. Following execution of an instruction, the processing result is stored to the registers 34, and, depending on the result, condition flags may be set to the condition information register 30 allocated to the instruction.

In the second processing circuitry 6, data engine instructions (e.g. floating-point or SIMD instructions) are decoded by a second decoder 40. The decoded instructions are then input to a rename stage 42 where the decoded instructions undergo renaming in a similar way to the instructions in the rename stage 12 of the first processing circuitry 4. The rename stage 42 of the data engine also identifies whether there are any conditional instructions which require a set of condition information from one of the condition information registers 30 of the first processing circuitry 4. The renamed instructions are then sent to a dispatch stage 44, and dispatched to the issue queue 46. The second processing circuitry 6 is also an out-of-order processor in which instructions can be issued for execution in a different order to the program flow order. The second processing circuitry 6 comprises several execution pipelines 50, 52, 54 for executing instructions.

The first processing circuitry 4 and second processing circuitry 6 communicate via an interface 58 for controlling forwarding of condition information from the condition information registers 30 to the second processing circuitry 6. The interface comprises a first forwarding path 60, a request path 65 and a second forwarding path 70.

The first forwarding path 60 comprises a valid information path 62 and a condition information path 64. The condition information path 64 forwards the condition flags from all the condition information registers 30 to the rename stage 42 of the second processing circuitry 6 (although in other embodiments only some of the sets of flags could be forwarded on the first forwarding path 60). The first processing circuitry comprises #C condition information registers 30 and each register comprises #F condition flags, and so the condition information path 64 of the first forwarding path 60 has a width capable of transmitting #C*#F flags per processing cycle. Meanwhile, the valid path 62 transmits a valid signal for each condition information register 30 indicating whether the contents of the condition information register 30 are valid or not. For example, the valid signal may comprise a single bit with a first state (e.g. logic 1) indicating valid information and a second stage (e.g. logic 0) indicating invalid information. Hence, the valid path 62 may have a bit width of #C bits (1 bit for each register).

The second forwarding path 70 has an address path 72 and a condition information path 74. When a conditional instruction is at the rename stage 42 of the second processing circuitry 6, if the required condition information is not yet valid (the corresponding valid bit on the path 62 is 0) then the instruction is sent further down the pipeline, and will wait in either the dispatch stage 44 or the issue queue 46 until the condition information becomes valid. The condition information path 74 of the second forwarding path 70 has a bit width of N*#C, where #C is the number of condition registers 30 in the first processing circuitry 4 and N is the number of sets of condition information that can be sent in one cycle via the second forwarding path 70. For example, N may equal 1 so that the second forwarding path 70 may only be able to transfer the contents of 1 condition information register per cycle. Therefore, the second forwarding path 70 requires much less overhead than the first forwarding path 60. The address path 72 is used to transmit the address (e.g. a register identifier) of the condition information register 30 which stores the condition information being transmitted on the condition information path 74 of the second forwarding path 70.

The request path 65 transmits a request signal from the second processing circuitry 6 to the first processing circuitry 4. The request signal comprises #C bits (where #C is the number of condition information registers). Each bit of the request signal indicates whether the condition information from a corresponding condition information register 30 is requested by the second processing circuitry 6. As shown in FIG. 3, the request signal on the feedback path 65 may comprise one bit line per condition information register 30. When a bit line has a first state (for example a logic high state) then this indicates that the corresponding set of condition information is requested, while a second state (e.g. logic low) indicates that the condition information is not requested.

The second processing circuitry 6 sets the request signal to indicate that a set of condition information is requested if the condition information is not valid when a conditional instruction requiring that information is in the rename state 42 of the second processing circuitry 6. When a set of condition information becomes valid, then the first processing circuitry 4 outputs the information over the second forwarding path 70 only if the feedback path 65 indicates that this set of information has been requested. Sets of condition information that are not indicated as requested in the request signal are not output on the second forwarding path 70, because if they are required by any conditional instructions in the second processing circuitry 6 then they will already have been provided over the first forwarding path 60. Therefore, the amount of information which needs to be transmitted on the second forwarding path 70 can be reduced, allowing fewer signal paths to be provided for transmitting condition information to later stages of the pipeline in the data engine 6. Once a bit line in the request signal 65 has been asserted to indicate a requested set of condition information, then it remains asserted until the corresponding information has been received over the second forwarding path 70. The second processing circuitry 6 can detect from the address on the address path 72 which condition information is being provided and then deasserts the corresponding bit line of the request signal on the feedback path 65 to indicate that the data is no longer requested. The register renaming stage 12 of the first processing circuitry 4 may only reallocate condition information registers 30 for use by other instructions when the request signal 65 does not indicate that the register is requested by the second processing circuitry 6.

In summary, most sets of condition information would be expected to be valid when a conditional instruction is in the rename stage 42 of the data engine 6. For example, often the data engine is executing relatively few instructions, increasing the likelihood that condition information is valid in time for the renaming stage. By directing the first forwarding path 60 only to a predetermined stage (in this case rename stage 42) of the second processing circuitry 6, it is not necessary to send all the sets of condition information to all of the stages. Another second forwarding path 70 is provided for cases where the condition information is not valid in time for the rename stage 42, but this can be made smaller because only requested condition information is sent via the second forwarding path 70. If there are no conditional instructions in the second processing circuitry 6, then no condition information will be requested and so the second forwarding path 70 will be unused. Hence, the interface 58 of the present technique enables the condition information to be sent from the first processing circuitry 4 to the second processing circuitry 6 more efficiently.

Figure 4:
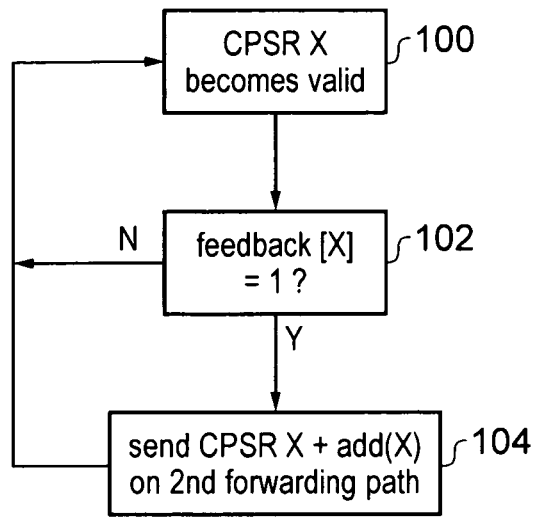
FIG. 4 is a flowchart indicating a method of outputting condition information on the second forwarding path.

FIG. 4 shows an example method for the first processing circuitry 4 to determine whether to output a set condition information by the second forwarding path 70. Note that FIG. 4 does not show the output of condition information on the first forwarding path 60 because the condition information from the registers 30 will be output via the first processing path 60 in each processing cycle.

At step 100 of FIG. 4, a set of condition information in condition information register X becomes valid (X indicates any of the condition information registers 30). This occurs when an instruction executed by either the first or second processing circuitry 4, 6 sets the valid bit for register X, indicating that the condition flags now have correct values. At step 102 the first processing circuitry 4 checks whether the corresponding bit X of the request signal on the feedback path 65 is asserted (feedback[X]=1). If so, then this indicates that the condition information in register X has been requested by the second processing circuitry 6, and so at step 104 the contents of register X are send to the second processing circuitry 6 via the second forwarding path 70, together with the address (add[X]) identifying the register X. If multiple sets of condition information become valid in the same processing cycle and the second forwarding path 70 does not have enough bandwidth to transmit all of the valid sets of information in the same cycle, then they can be transmitted in series over several cycles. On the other hand, if the information in register X has not been requested, then following step 102 the method returns to step 100 without sending the condition information via the second forwarding path 70.

Figure 5:
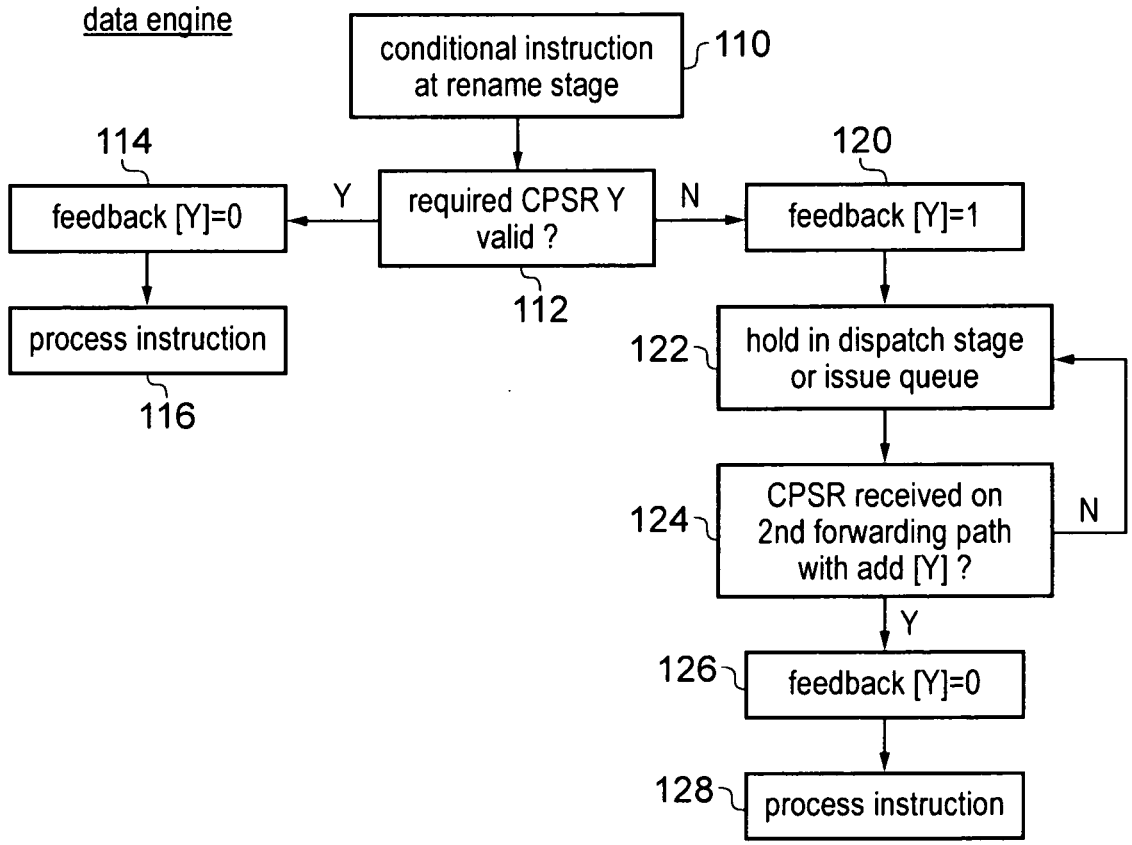
FIG. 5 is a flowchart illustrating a method of processing a conditional instruction and requesting condition information for the conditional instruction.

FIG. 5 shows a corresponding method performed by the second processing circuitry 6 (data engine) to process a conditional instruction. At step 110 a conditional instruction is detected by the rename stage 42 of the data engine 6. At step 112 the rename stage 52 detects whether the set of condition information required by the instruction (in this example the information in condition information register CPSR Y) is valid. This is done by checking whether the corresponding valid bit on the valid path 62 of the first forwarding path 60 indicates that the information is valid.

If the required information is valid, then at step 114 the second processing circuitry 6 sets the corresponding bit feedback[Y] of the request signal on the feedback path 65 to indicate that the information from register Y is not requested (e.g. the bit is set to 0). This prevents the first processing circuitry 4 transmitting this information over the second processing path 70 and allows the rename stage 12 in the first processing circuitry 4 to reallocate the register Y to other processing instructions if possible. At step 116, the conditional instruction is then processed by the remaining stages of the second processing circuitry 6 using the obtained condition information from register Y.

On the other hand, if at step 112 it is found that the required condition information in register Y is not yet valid, then at step 120 the corresponding bit line of the request signal on feedback path 65 is set to indicate that this set of information is a requested set of information (feedback[Y]=1 in this example). At step 122 the conditional instruction is forwarded to subsequent stages of the pipeline and held in either of the dispatch stage 44 or the issue queue 46. At step 124, the second processing circuitry 6 monitors the second forwarding path 70 to check whether the address of register Y is received on the address path 72. If so, then the condition information received on the condition information path 74 can be used to execute the conditional instruction, and so the information no longer needs to be requested. Therefore, at step 126 the corresponding bit of the request signal is set to indicate that the information from register Y is not requested anymore (feedback[Y]=0), allowing the first processing circuitry 4 to reallocate to the register counter Y for use by a different instruction if necessary. By enabling reallocation of the condition information registers 30 as soon as they are no longer required by a pending instruction then later instructions can be processed more quickly, improving performance. At step 128, the conditional instruction is processed by the remaining stages of the pipeline.

FIG. 6 shows an example sequence of instructions processed by the core 4 and data engine 6 using condition information in the condition information registers 30. In cycle 0, an instruction inst0 in the core 4 produces condition information which is stored to condition register CPSR 0. However, this condition information is not valid yet. For example, an earlier instruction which influences the condition information may not yet have been processed because of the out-of-order execution performed by the core 4. Hence, the corresponding bit valid[0] of the valid signal is set to zero to indicate that the condition information is not yet valid. Several cycles later, in cycle 5 the condition information becomes valid and so the condition information register block 30 of the first processing circuitry 4 sets the corresponding valid bit valid[0] to 1. In cycle 6, a conditional instruction inst1 which requires the condition information in register CPSR 0 is in the rename stage 42 of the data engine 6. As valid[0] on path 62 is 1, then the required information is valid and the rename stage 42 obtains the required condition information from path 64 of the first forwarding path 60. The conditional instruction inst1 can then proceed along the rest of the pipeline and can be processed. The second forwarding path 70 is therefore not necessary in this case.

In a later cycle 10 the core 4 executes an instruction inst2 which produces condition information stored to register CPSR 2. The condition information is not yet valid, so the corresponding valid bit valid[2] is set to zero. In cycle 11, the data engine 6 encounters a conditional instruction inst3 in the rename stage 42 which requires the information from register CPSR 2. As valid[2] is still 0, the rename stage 42 cannot use the condition information from the first forwarding path 60. The instruction inst3 is sent to dispatch stage in the following processing cycle 12 and the corresponding bit of the request signal (feedback[2]) is set to 1 to indicate that the information from CPSR 2 is a requested set of condition information.

Meanwhile, at processing cycle 12 the core executes an instruction inst4 which produces condition information to be stored in condition information register CPSR 4. This information is not yet valid so again the corresponding valid bit valid[4] is set to 0. In a similar way to cycles 11 and 12, in cycles 13 and 14 another conditional instruction inst5 is in the rename stage 42 of the data engine and requires the condition information from register CPSR 4. As the corresponding valid bit valid[4] is 0, the first forwarding path 60 cannot be used and the corresponding bit of the request signal, feedback [4] is set to 1.

At cycle 20, the condition information in both registers CPSR 2 and CPSR 4 becomes valid and so the corresponding valid bits valid[2], valid[4] are both set to one. As the feedback bits [2] and [4] of the request signal are both equal to 1, both sets of condition information need to be transmitted to the data engine 6 over the second forwarding path 70. However, in this example, the second forwarding path 70 can only output one set of condition information per cycle. Therefore in cycle 20 the first processing circuitry 4 sends the contents of CPSR 2 via path 74 of second forwarding path 70 and outputs the address of register CPSR 2 on the address path 72. In a subsequent cycle 21 the corresponding information for register CPSR 4 is output via the second forwarding path 70. In this example, when there is too much condition information to be transmitted over the second forwarding path 70 in one cycle, then information from the register with a lower register number (e.g. CPSR 2) is sent ahead of information from the register with a higher register number (e.g. CPSR 4). However, other schemes for prioritising the registers are also possible.

In cycle 21, the data engine 6 receives condition information from register CPSR 2 and so instruction inst3 can now be processed. As the information from register CPSR 2 is no longer required by the data engine 6, the corresponding bit of the request signal feedback[2] is now set to 0 to enable real-location of register CPSR 2 for use by other instructions. Similarly, in cycle 22 to the data engine 6 receives the condition information for register CPSR 4 and identifies from the address on path 72 that this can be used for instruction inst5. Instruction inst5 is now processed and the corresponding request bit feedback[4] is set to 0 to indicate that the contents of CPSR 4 are not requested anymore.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
   first processing circuitry configured to execute program instructions and to maintain a plurality of sets of condition information for indicating characteristics of the outcomes of the program instructions;
   second processing circuitry comprising a processing pipeline having a plurality of pipeline stages, wherein the second processing circuitry is configured to execute at least one conditional instruction having an outcome dependent on one of the plurality of sets of condition information maintained by the first processing circuitry;
   a first forwarding path configured to forward sets of condition information from the first processing circuitry to a predetermined pipeline stage of the processing pipeline of the second processing circuitry;
   a request path configured to transmit a request signal from the second processing circuitry to the first processing circuitry, the request signal for indicating a requested set of condition information which was not yet valid when a conditional instruction dependent on the requested set of condition information was at the predetermined pipeline stage; and
   a second forwarding path, wherein in response to the requested set of condition information becoming valid, the first processing circuitry is configured to forward the requested set of condition information via the second forwarding path to a subsequent pipeline stage of the processing pipeline of the second processing circuitry.

2. The data processing apparatus according to claim 1, wherein in response to receiving the requested set of condition information via the second forwarding path, the second processing circuitry is configured to process the at least one conditional instruction using the received set of condition information.

3. The data processing apparatus according to claim 1, wherein the first processing circuitry is configured to maintain C sets of condition information; and the second forwarding path is capable of forwarding N requested sets of condition information in the same processing cycle, where C and N are integers and N<C.

4. The data processing apparatus according to claim 3, wherein N=1.

5. The data processing apparatus according to claim 3, wherein if more than N requested sets of condition information become valid in the same processing cycle, then the first processing circuitry is configured to transmit the requested sets of condition information via the second forwarding path in multiple processing cycles.

6. The data processing apparatus according to claim 1, wherein the request signal indicates whether or not each set of condition information is a requested set of condition information.

7. The data processing apparatus according to claim 6, wherein in response to a conditional instruction requiring a selected set of condition information which is not valid when the conditional instruction is at the predetermined pipeline stage, the second processing circuitry is configured to control the request signal to indicate that the selected set of condition information is a requested set of condition information.

8. The data processing apparatus according to claim 6, wherein in response to a conditional instruction requiring a selected set of condition information which is valid when the conditional instruction is at the predetermined pipeline stage, the second processing circuitry is configured to control the request signal to indicate that the selected set of condition information is not a requested set of condition information.

9. The data processing apparatus according to claim 6, wherein in response to receiving a requested set of condition information via the second forwarding path, the second processing circuitry is configured to control the request signal to indicate that the received set of condition information is not a requested set of condition information.

10. The data processing apparatus according to claim 1, wherein the first processing circuitry is configured to forward the requested set of condition information via the second forwarding path together with an identifier identifying the requested set of condition information.

11. The data processing apparatus according to claim 1, wherein the first processing circuitry comprises a plurality of condition information registers for storing the plurality of sets of condition information.

12. The data processing apparatus according to claim 11, wherein at least one of the first processing circuitry and the second processing circuitry comprises register allocation circuitry for controlling allocation of the condition information registers to respective program instructions, wherein the set of condition information for a program instruction is stored in the condition information register allocated to the program instruction.

13. The data processing apparatus according to claim 12, wherein the register allocation circuitry is configured to prevent re-allocation of a condition information register for which a corresponding set of condition information is indicated as a requested set of condition information by the request signal.

14. The data processing apparatus according to claim 1, wherein each set of condition information comprises one or more condition flags, each condition flag indicating a characteristic of an outcome of a program instruction.

15. The data processing apparatus according to claim 1, wherein the predetermined pipeline stage comprises a register allocation stage for allocating registers to instructions to be processed by the second processing circuitry.

16. The data processing apparatus according to claim 1, wherein at least one of the first processing circuitry and the second processing circuitry is configured to perform out-of-order execution of program instructions.

17. The data processing apparatus according to claim 1, wherein the second processing circuitry comprises a floating-point unit for executing program instructions for carrying out floating-point operations.

18. The data processing apparatus according to claim 1, wherein the second processing circuitry comprises a processing unit for executing program instructions for carrying out single-instruction-multiple-data (SIMD) operations.

19. A data processing apparatus comprising:
first processing means for executing program instructions and for maintaining a plurality of sets of condition information for indicating characteristics of the outcomes of the program instructions;
second processing means, comprising a processing pipeline having a plurality of pipeline stage means for processing program instructions, for executing at least one conditional instruction having an outcome dependent on one of the plurality of sets of condition information maintained by the first processing means;
first forwarding means for forwarding sets of condition information from the first processing means to a predetermined pipeline stage means of the processing pipeline of the second processing means;
requesting means for transmitting a request signal from the second processing means to the first processing means, the request signal for indicating a requested set of condition information which was not yet valid when a conditional instruction dependent on the requested set of condition information was at the predetermined pipeline stage means; and
second forwarding means for forwarding the requested set of condition information, wherein in response to the requested set of condition information becoming valid, the first processing means is configured to forward the requested set of condition information via the second forwarding means to a subsequent pipeline stage means of the processing pipeline of the second processing means.

20. A data processing method comprising:
executing program instructions using first processing circuitry, the first processing circuitry maintaining a plurality of sets of condition information for indicating characteristics of the outcomes of the program instructions;
executing at least one conditional instruction using second processing circuitry comprising a processing pipeline having a plurality of pipeline stages, the at least one conditional instruction having an outcome dependent on one of the plurality of sets of condition information maintained by the first processing circuitry;
forwarding sets of condition information from the first processing circuitry via a first forwarding path to a predetermined pipeline stage of the processing pipeline of the second processing circuitry;
transmitting a request signal from the second processing circuitry to the first processing circuitry, the request signal indicating a requested set of condition information which was not yet valid when a conditional instruction dependent on the requested set of condition information was at the predetermined pipeline stage; and
in response to the requested set of condition information becoming valid, forwarding the requested set of condition information from the first processing circuitry via a second forwarding path to a subsequent pipeline stage of the processing pipeline of the second processing circuitry.

* * * * *